United States Patent [19]

Catalanotti et al.

[11] Patent Number: 5,540,582

[45] Date of Patent: *Jul. 30, 1996

[54] EXPANDABLE CAVITY CORE ELEMENT FOR USE IN AN INJECTION MOLDING SYSTEM

[75] Inventors: Paul Catalanotti, West Newton; Sassan Tarahomi, North Chelmsford, both of Mass.

[73] Assignee: Roehr Tool Corporation, Hudson, Mass.

[*] Notice: The term of this patent shall not extend beyond the expiration date of Pat. No. 5,387,389.

[21] Appl. No.: 420,139

[22] Filed: Apr. 11, 1995

Related U.S. Application Data

[63] Continuation-in-part of Ser. No. 383,818, Feb. 6, 1995, which is a continuation of Ser. No. 172,856, Dec. 23, 1993, Pat. No. 5,387,389, which is a continuation-in-part of Ser. No. 16,294, Dec. 10, 1993, Pat. No. Des. 356,320.

[51] Int. Cl.$^6$ .................................................. B29C 45/44
[52] U.S. Cl. ................ 425/577; 425/809; 425/DIG. 58
[58] Field of Search ................................. 425/577, 809, 425/DIG. 58

[56] References Cited

U.S. PATENT DOCUMENTS

| 3,555,606 | 1/1971 | Hedgewick | 425/809 |
| 4,919,608 | 4/1990 | Catalanotti et al. | 425/577 |
| 5,090,888 | 2/1992 | Pfannkuchen | 425/577 |

FOREIGN PATENT DOCUMENTS 256194  2/1982  Spain .

OTHER PUBLICATIONS

Verified Translation of Spanish Utility Model No. 256 194 Tarradell—Published Jan. 26, 1981, translated Oct. 25, 1995 Copy of Translation Verification.

*Primary Examiner*—Tim Heitbrink
*Attorney, Agent, or Firm*—Richard P. Crowley

[57] ABSTRACT

An expandable cavity core element for use in a method and system for molding a plastic article having inward or outward projections on the exterior surface. The injection mold has an expandable cavity core element adapted to move between a closed, molding position and an open, article-recovering position and which defines a mold cavity for an article to be molded. The cavity element has a base with an opening therethrough and a plurality of outwardly tapered arms extending from the base to an open end that extends into the mold cavity where it is held in place by a striker plate during the injection molding process. The cavity element has an outer, tapered exterior surface length which is always equal to or larger than the total molding length of the interior molding cavity. The cavity element may include an outwardly tapered exterior surface or a multiple-tapered exterior surface, such as an outwardly tapered surface and then an inwardly tapered surface. Optionally, an inner mandrel mold part is employed, adapted to move reciprocally and longitudinally within the base and arms of the expandable cavity element, the top end threaded to form the interior threaded surface of the injection molded article.

19 Claims, 9 Drawing Sheets

EXPANDABLE CAVITY CORE ELEMENT FOR USE IN AN INJECTION MOLDING SYSTEM

REFERENCE TO PRIOR APPLICATIONS

This application is a continuation-in-part application of Ser. No. 08/383,818, filed Feb. 6, 1995, which application is a continuation of Ser. No. 08/172,856, filed Dec. 23, 1993, now U.S. Pat. No. 5,387,389, issued Feb. 7, 1995. This application is also a continuation-in-part of Ser. No. 29/016, 294, filed Dec. 10, 1993, now U.S. Pat. No. Des. D356,320, issued Mar. 14, 1995.

BACKGROUND OF THE INVENTION

There are a wide variety of injection molding systems for the molding of plastic parts by the injection of plastic under high pressure and temperature into a mold cavity. Injection molding parts which require internal threads or such protusions or cut outs or similar defamations in the molded parts often preclude the directed straight line withdrawal of the molded plastic parts from the mold cavity of the injection-molding apparatus. If molded articles such as threaded caps are to be molded, various collapsible cores are employed, so that the core element may be withdrawn and an article with internal threads or undercuts may be easily formed. Injection molding systems employing collapsible cores are described, for example, in U.S. Pat. No. 4,456,214 issued Jun. 26, 1984 and U.S. Pat. No. 4,919,608 issued Apr. 24, 1990.

It is often desirable in injection molding systems to provide for a molded plastic article which has inward or outward projections on the external sides or surfaces of the article and optionally inward or outward projections on the internal surface of the molded object, which internal surfaces may be formed with a mandrel, such as a collapsible core, unscrewing core or straight pull out element. Typically, such molded articles may, for example, be tamper evident-sealed enclosure caps or parts with external threads or any external surface detail that precludes straight pull.

It is therefore desirable to provide for an injection molding system and method employing an expandable cavity core element which will provide for the production in an efficient, effective manner of molded articles having inward and/or outward external projections on the external surface, and optionally inward or outward projections or windows on the internal surfaces as desired.

SUMMARY OF THE INVENTION

The invention relates to expandable cavity core elements, useful in an injection molding method and system employing the expandable cavity element to provide for the manufacture of molded articles with external inward or outward projections, and, optionally, also with internal projections and openings in the plastic molded article.

The injection molding system and method of the invention comprises the employment and use of an expandable cavity element, typically composed of metal, and having a generally circular base and a plurality of generally vertically, upwardly extending arms from the base, to form at the one end of the cavity element an internal surface which is adapted to surround and to be placed within a mold cavity, and to form external inward or outward projections in a molded article. The cavity element in the relaxed, unbiased state has the one end of the arm element extending outwardly and in a non-contacting, slightly spaced-apart, relaxed position, generally with the upper surface of the one end of the cavity element forming a cylinder and having an exterior tapered surface at the one end to permit the operation of a striker plate and other means to provide fox the movement at the one end of the plurality of arms of the cavity element between a relaxed, unbiased, open position, wherein the sides of the extending arm elements are not in contact, and a closed molding position, wherein the one end of the arm elements are forced together into a closed, contacting position to form external geometry of the molded article within the mold cavity, with the sides of the arm elements in contact in the biased, forced condition, when a striker plate is employed in the injection molding system and method. The expandable cavity core element includes an inwardly tapered, upward surface at the one end and includes projections or recesses in the internal surface of the arms at the one end to form the desired molded object in the injection molding system of the invention.

The expandable cavity element may also include an outwardly tapered, upward exterior surface or a multiple tapered exterior surface, such as an outwardly tapered surface and then an inwardly tapered surface. The exterior tapered surface may vary in angle from the longitudinal axis, for example, from 3 to 35 degrees, such as 3 to 15 degrees, for an outwardly tapered surface, or 15 to 35 degrees for inward-outward double surface.

Thus, the cavity core element may include negative (outward), positive (inward) and combinations of negative-positive surfaces as required and useful in the molding method and system. The various tapers allow for increased versatility of length in the molding length as desired.

The expandable cavity element as employed in the invention may be used alone or in combination with mandrel-type elements, placed within and at the one end of the collapsible core element and within the core cavity, such as a mandrel or collapsible core element to form the internal dimensions of a molded article in the injection molded system.

The expandable cavity element has an outside, exterior, tapered surface length which is equal to or larger than the total molding length of the interior molding cavity, such as from 1.0 to 1.2.

The core element generally comprises an expandable cavity element, integrally formed of spring steel metal and having a base with an opening therethrough. A plurality of generally vertically biased arms having an one and other end, the other end extending from the base and the one open end adapted to extend into the mold cavity, having an extended tapered exterior surface. The one open end, on its interior surface, has a surface machined to form the projections or openings on the exterior surface of an article to be molded. The arms of the expandable cavity are adapted to move at one end between an open, extended, biased position, with the ends of the arms in an open non-molding position, and a closed, side-arm contacting, force-retained molding position.

The core element has a band section toward the one end with a tapered exterior surface from the longitudinal axis of the core element. The tapered surface extends generally from the band section to the one end, defining a tapered surface length. The core element also has a molding cavity at the one end when the core element is in a molding position, the cavity having an interior surface and defining a longitudinal molding length. The tapered length of the core element must always be equal to or greater than the molding length.

The injection molding system of the invention is for the injection molding of molded articles such as, but not limited to, a closure cap having exterior and interior threads with or without windows or other projections. This method comprises providing an injection mold having a first and a second mold part, and the mold part adapted to move between a closed, molding position to form a molding cavity, and an open article-recovery position to recover the article. The injection molded method includes an expandable cavity element having a base with an opening therethrough and a plurality of outwardly extended, generally vertically, upwardly tapered arms extending from the base, typically a cylindrical base, and about the base opening, and extending to an one end, the arms of this one end extending into the mold cavity in the closed molding position, and having an extended and inwardly tapered exterior surface at the one end, and with an internal surface on the one end of the arms having projections or recesses therein, to form the desired recesses or projections on the exterior surface of the molded article. The expandable cavity element employed in this method is adapted to move between an opened, relaxed, unbiased, extended position with the ends of the arms in an open, non-contacting position and a closed end, side-arm contacting, force-retained position within the mold cavity during the molding operation.

Optionally and preferably, the method also includes the employment of a mandrel element, having a one and the other end, such as a collapsible core or screw-type mandrel adapted for reciprocal movement within the mold cavity, generally longitudinally, such as threadable movement within the base and arms of the expandable cavity element. The mandrel element is adapted to move between an extended position, wherein the one end forms with the interior surface of the cavity element and the exterior surface of the one end of the mandrel portion of the mold cavity for the formation of the article to be molded, and a withdrawn non-use position, wherein the mandrel has been extracted from the mold cavity and the molded article recovered. Thus, where the expandable cavity element and a mandrel are employed in combination within a mold cavity in an injection-molding system, molded articles with exterior and interior surface projections and recesses may be formed. However, it is well recognized that the expandable cavity and the method may be formed without the use of a mandrel and a molded closure cap, for example, or other molded objects formed with having merely windows in the surface and external projections, having no recesses or projections in the internal surface of the article.

The method includes a second mold part having a surface portion of the mold forming the mold cavity tapered inwardly, so that in the closed molding position of the mold, the inwardly tapered surface is mechanically forced at the one end of the plurality of arms of the expandable cavity element into the closed, forced, biased position with the sides of the arms in contact within the molding cavity to form a closed peripheral surface for the formation of the molded part. The method includes moving the first and second mold parts to a molding position and forcing one open end of the arms of the expandable cavity element in the mold cavity into a closed, force-retained position within the mold cavity by movement of the mold part, typically longitudinal movement against the inwardly-tapered surface of the cavity element, and then simultaneously or thereafter placing the one end of the mandrel in an extended position within the cavity element to form the core for the article to be molded. The method includes, in the molding position, injecting a molding plastic material, typically under high pressure and temperature into the mold cavity so formed between the closed cavity element and the one end of the mandrel to form the molded article in the mold cavity, thereafter moving the second molded part to an open article-recovery position to permit the plurality of arms of the expandable cavity element to move automatically outward to the relaxed, biased, open position, thereby permitting the withdrawal of the mandrel, where used, to a non-use position, then recovering from an open portion of the mold the article so molded.

In one preferred embodiment, the injection molding method and system includes an expansion limiter sleeve means peripherally positioned about the one end of the said arms of the expandable cavity element and slightly spaced-apart therefrom in the molding position. A method then includes moving the second mold part to permit the arms of the expandable core elements to move just slightly outward, say, for example, less than 0.1 inches, and to rest on the interior surface of the expansion limiter sleeve squeeze means, so as to reduce the pressure on the said arm sufficiently, but to have said arms retain a firm hold on the article just formed where a mandrel is used, and includes longitudinally moving the mandrel to a withdrawn position, while the arms of the expandable cavity element retain the molded article in position. Thereafter, the expansion limiter sleeve means is moved to permit the expandable cavity element to permit the arms of the expandable cavity element to move outwardly into the open, relaxed, biased position. Generally, the expansion limiter plate means is placed within the injection mold system, intermediate the first and second mold parts, and is operated by moving the expansion limiter sleeve element longitudinally upward away from the first mold part to release pressure on the said arms of the cavity element and to permit the expandable cavity element to move to the fully opened, biased position. The molding method is then repeated at the other end of the cavity element, with the mold parts forming a mold cavity, for example, for a cap closure, and then injected with plastic.

In a preferred method of operation of providing a molded part having exterior and interior surface projections or windows employing both an expandable cavity element and an inside mandrel to form the mold cavity, the method includes placing the injection mold in a closed position with the expandable cavity element in a forced, closed, molding position, and the one end of the mandrel within the other end of the cavity element, with the mold pans forming a mold cavity for example, for a cap closure and then with plastic injected into the mold cavity to form the molded article, and includes opening the mold and releasing the pressure on the arm elements of the expandable cavity element slightly by allowing the arm elements to be expanded slightly to the interior surface of the expansion limiter sleeve so as to hold the molded plastic part in position while the mandrel is longitudinally removed, such as by threadably removing the mandrel from the molded part into a non-use position. The unscrewing of the mandrel from the molded part takes place and does not wear down the expandable cavity element, as the cavity element is moved out a slight distance and held in place by the expansion limiter sleeve. The method then includes the removal upwardly, typically longitudinally and upwardly, of the expansion limiter sleeve element so that the arms of the expandable cavity element may then move to a natural, relaxed, outwardly-extended, biased position and the molded article may be ejected from the outwardly expanded cavity element in the mold cavity, and thereafter the cycle is repeated.

Optionally and preferably, the system and method may include a positive molded article-ejection or discharge means as part of the molding cycle, to eject affirmatively from the molding cavity the molded article. Where the molded article contains internal threads or projections, the mandrel should be withdrawn or collapsed prior to activation of the article ejection means to avoid stripping of the internal projections, as in the illustrated example, or, where there are no internal threads or projections, the mandrel may remain in place.

In one example of a positive article-ejection means, the expansion limiter sleeve means may be used, with the internal upper surface of the sleeve tapered inwardly, so that on upward movement of the sleeve and its associated molded plate in which it is held after the mold is open, the upper surface contacts and positively ejects the molded article from the mold cavity and subsequently returns to its prior position for another molding cycle.

In another example, the mandrel may include a reciprocating, close-fitting, slidable, moveable, outer sleeve, e.g. cylindrical about the mandrel, such as a mandrel which is longitudinally withdrawn, such as by unscrewing, to a withdrawn position or collapsed in place after the molding of the article occurs, and then the mandrel sleeve is reciprocally, longitudinally moved upwardly to eject positively the molded article in the open mold position by the top of the mandrel sleeve forcing the lower end of the article from the mold cavity. The mandrel sleeve is then withdrawn to a lower position for a new molding cycle.

The system and method shall be described for the purposes of illustration only in connection with an injection molding system and method; however, the expandable cavity element may also be effectively used in other article-forming systems, such as, but not limited to: blowing molding of articles, such as plastic containers or olefinic or other thermoplastic polymers, molding the preform parison for blow-molding or in a die casting operation, such as the die casting of metal parts, like zinc.

The invention will be described for the purpose of illustration only in connection with certain embodiments; however, it is recognized that those persons skilled in the art may make various modifications, changes, additions and improvements to the illustrated embodiments without departing from the spirit and scope of the invention.

DESCRIPTION OF THE EMBODIMENTS

Figure 1:
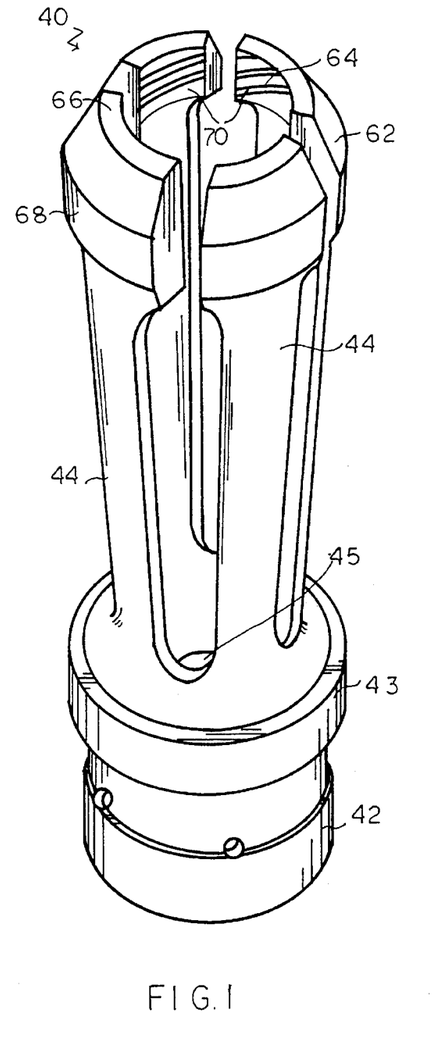
FIG. 1 is a perspective view of the expandable cavity tool of the injection molding system of the invention in an open, relaxed, expanded position.
Figure 2:
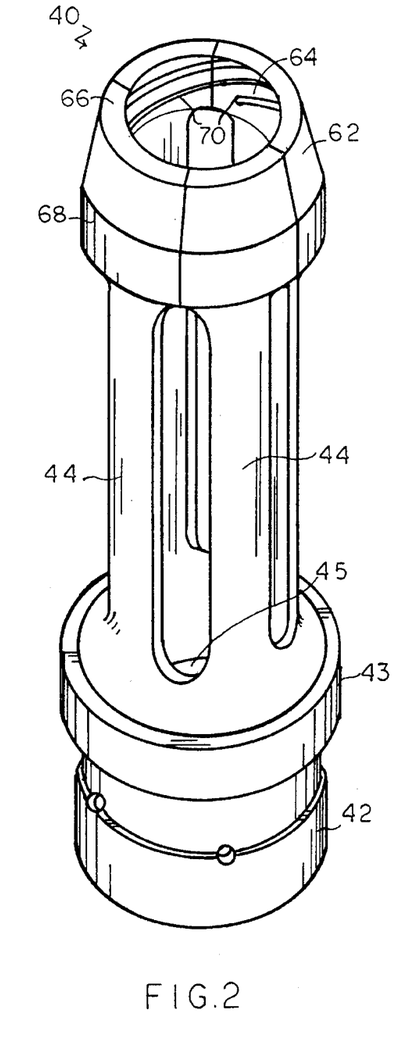
FIG. 2 is a perspective view of the expandable cavity tool of the injection molding system of the invention in a closed, molding position.

With particular reference to FIGS. 1 and 2 of the drawings, FIG. 1 is a perspective view of the expandable cavity element or tool used in the described injection molding system and method of the invention 40 in an open, relaxed, expanded non-molding position. The tool 40, formed of a spring steel metal and having a lower base 42 surrounded by cylindrical ridge base 43 and having a plurality of arms 44 as illustrated extending upwardly from the cylindrical ridge 43 to a generally cylindrical outer band section 68 at the one end which has a smoothly tapered surface 62 which extends to a plurality of arcuate pieces 66 which, when forced together into a molding position, (see FIG. 2) form a generally cylindrical opening 45 within the ridge 43 to extend to the one open end, and the inside surface of the open end of the arms 44, the inside surface, represented as 64, includes a plurality of recesses 70 to form outwardly projecting cap threads in the article to be molded. The tool 40 as illustrated in FIG. 1 is in the open, expanded and relaxed position, while in FIG. 2 it is shown in the biased, closed molding position, wherein the sides of the arms 44 have been placed in contact with each other, as it would be within the molding cavity with the arms forced together so the imposition of an exterior surface of the mold part against the tapered surface 62 at the other end of the arms (see FIGS. 3–6).

Figure 3:
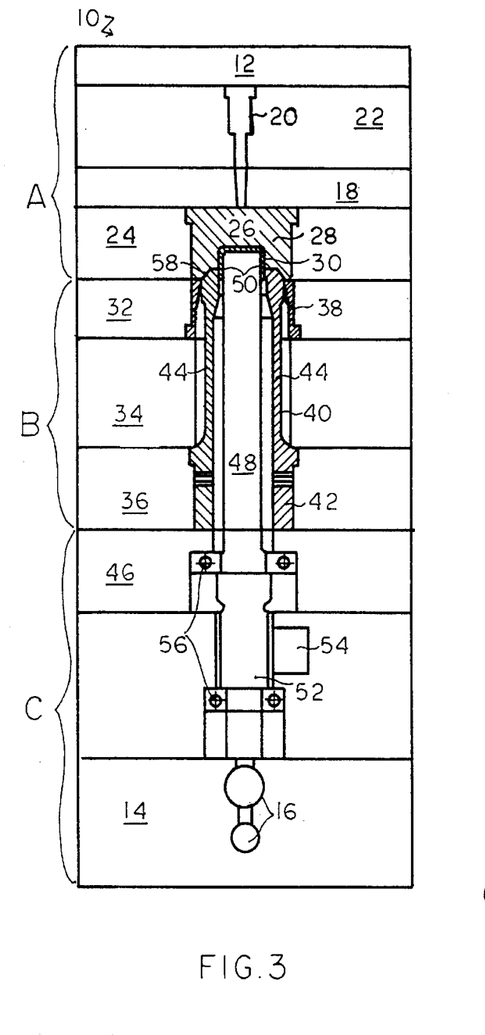
FIGS. 3–6 are schematic, illustrative, sectional views of the expandable cavity element in an injection molding system with the system components in different positions during the operation of the molding process.
Figure 4:
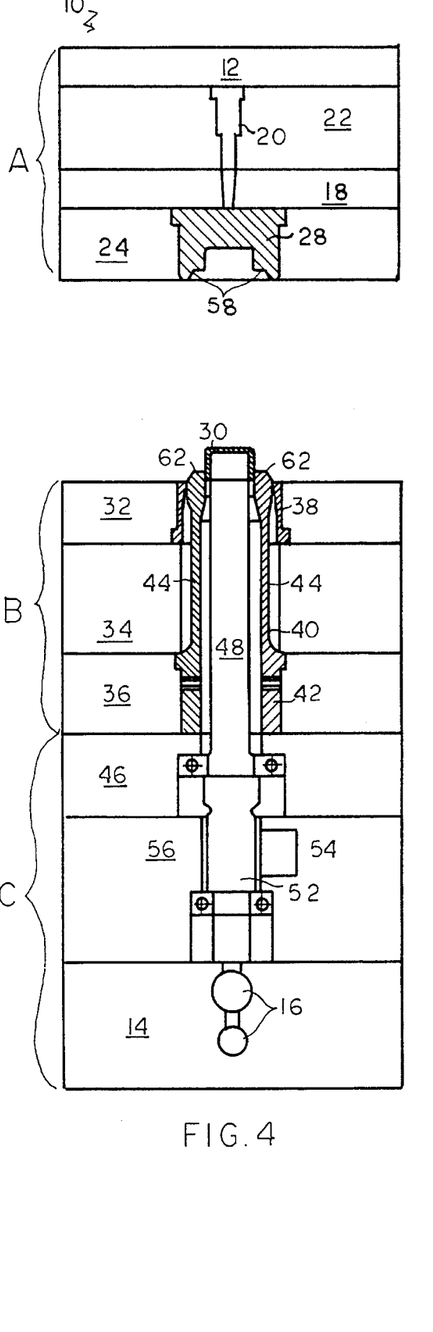
Figure 5:
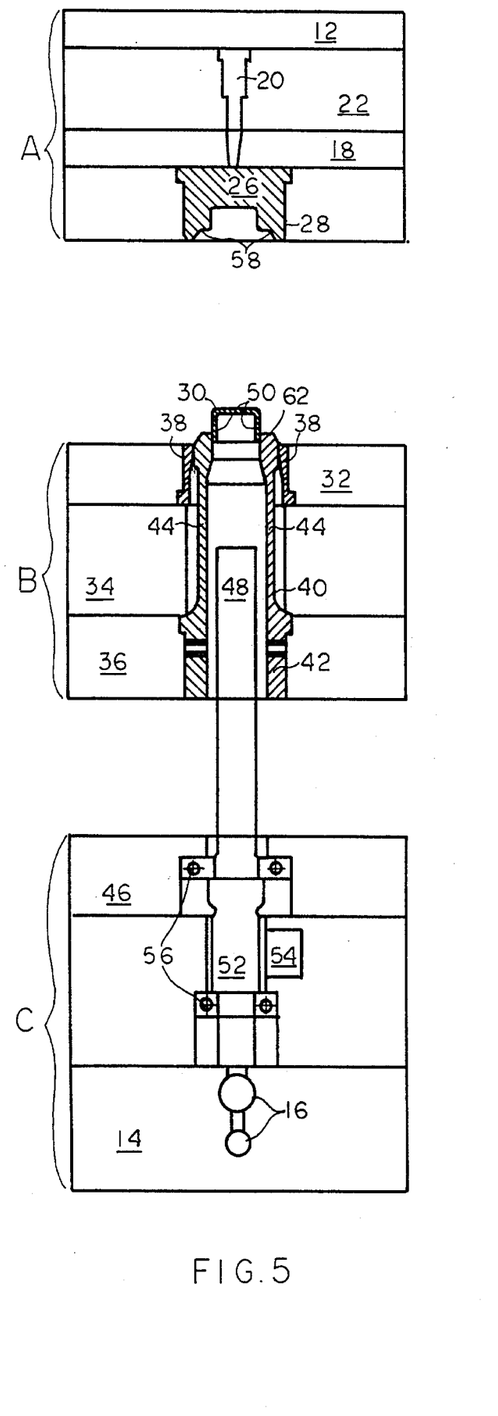
Figure 6:
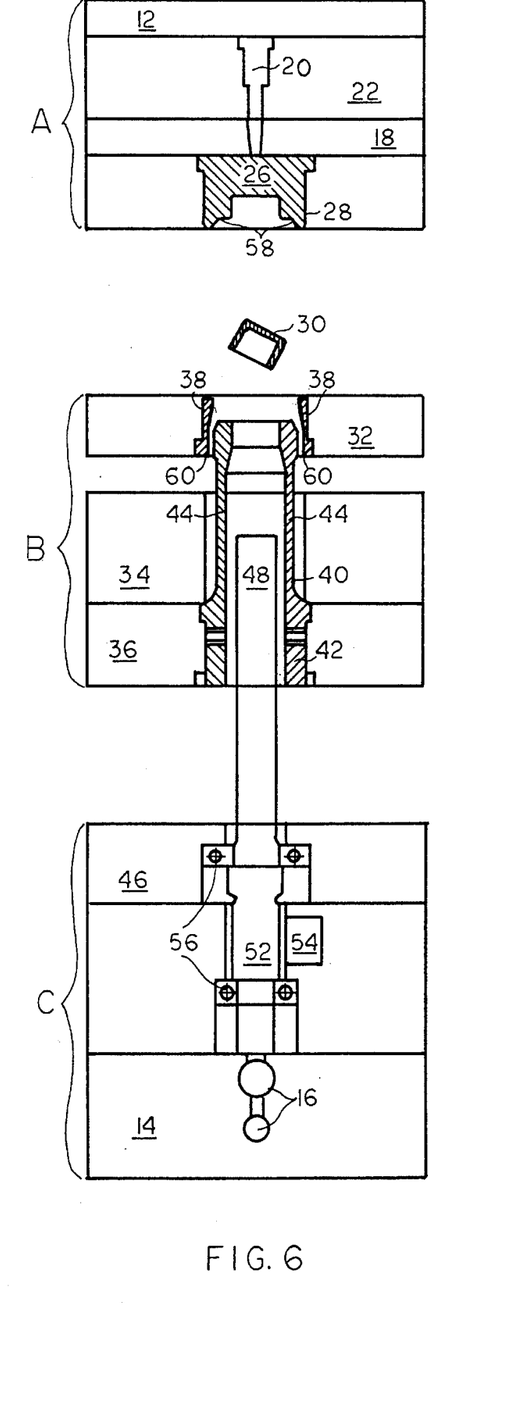

FIGS. 3–6 are schematic, illustrated sectional views of the expandable cavity tool or element of the invention employed in an injection molding system and method, wherein FIG. 3 is a composite mold composed of parts A, B and C joined and illustrates the injection molding system in a molding position, wherein the expandable cavity element 40 has been placed in a tension-biased molding position within the mold cavity. FIG. 4 is directed to the removable part A of the mold with the one end of the core element 40 with the band section of the arms 4A positioned against the surfaces of an expansion limiter sleeve 32 to relieve pressure slightly so as to permit a mandrel 48 to be longitudinally unscrewed and moved downwardly. FIG. 5 is a sectional view of the injection mold system and method wherein the internal mandrel has been unscrewed while the article molded part has been held within the one end of the expandable cavity element 40. FIG. 6 is a sectional view of the mold parts A, B and C in an open article-recovery position, showing the discharge of said molded article 30 with the parts A, B, and C being longitudinally removed in a reciprocal manner throughout FIGS. 3, 4, 5 and 6.

FIG. 3 illustrates the injection molding system and method of the invention with the expandable cavity element in a molding position with a mold 10 composing sections A, B and C in a molding position and including a backup plate top 12 and backup plate bottom 14 with water cooling holes 16 providing a spruce part plate 18 which defines a plastic material injection molding port 20 within an injection part plate 22. The mold 10 includes a striker cavity plate 24 with a striker cavity insert 26 to define a striker cavity 28. The injection molding system provides for a closure cap 30 illustrated and in the particular injection molding system and method described having both external and internal undercuts, such as a tamper-evident cap for use with packaging.

The mold includes an expansion limiter plate 32 and a support plate 34 in a cavity mounting plate 36 with a cylindrical retaining-ejector sleeve 38 having an inwardly tapered internal surface at its upper end about the expandable cavity element or tool 40, in the base 42 and the arms 44 providing for an unscrewing support plate 46. The mold 10 also includes a screwable type mandrel 48 which may also comprise a collapsible core as desired or a striker pin. The mandrel includes exterior surface threads 50 on the one end of the mandrel in order to form the internal threaded projections on the inside of the molded article cap 30 while the interior surface of the core element includes recesses 70 in order to provide for external projected threads on the molded cap 30. The mold system includes a pinion-gear unscrewing mandrel 52 to unscrew mandrel 48 and includes a rack pinion gear 54 and bearings 56 while insert 26 includes a curved surface which presses against the tapered surface 62 of the core element 40 in order to place the core element 40 into a biased molding position, while the space 60 illustrates the space between the other ends of the arms 44 of the core element 40 in the relaxed, open position. Where a collapsible core is employed as the mandrel element, then the collapsible core need not be moved longitudinally, but may move between an expanded molding position and an inwardly collapsed condition for the receiving of the molded article.

In operation, the mold 10 shows the mold components A, B and C in an injection molding position, with plastic material injected through the port 20 into the mold cavity to form the molded article 30 and with the core element in the closed molding position under tension due to the forcing together of the arms 44 by the surface 58 against the surface 62 with the mandrel 48 extending upwardly to form the inner surface of the molded article 30.

FIG. 4 shows the inside of the mold 10 which has longitudinally withdrawn with the side arm elements 44 of the expandable tool 40 moved slightly outward, say, for example, about 0.05 to 0.1 inches, the movement by band section 68, against the internal surface of the expansion limiter sleeve 38. This movement is sufficient to hold the molded article 30 in position yet sufficient to permit the mandrel 48 or collapsible core to be threadably withdrawn at the one end from the interior of the molded article 30. FIG. 5 illustrates that the mandrel 48 has been completely unscrewed on the molded article 30 held in position by the tension-biased arms 44 of the expandable cavity element 40.

FIG. 6 is directed to the mold of A, B and C in an open, article-discharging position, wherein the striker plate means B, shown also in FIG. 5, moved and the expansion limiter plate moved upwardly to relieve the tension on the outer tapered surface 62 of the arms 44 of the expandable cavity element 40, thereby permitting the expandable cavity element to move to its open, relaxed, non-molding position, and to permit the discharge of the molded article 30 containing projections or windows both on the exterior and interior surfaces. The molding cycle is then repeated as in FIGS. 3–6 by the upward movement of the sleeve 38, which strikes and ejects the molded article from the mold cavity.

FIGS. 7–10 are similar to FIGS. 3–6, except for the employment of a slidable, cylindrical, extended ejector sleeve 72 about the mandrel 48 having a one end secured to a separate, moveable mold plate 98 of part C of the mold and the other end closely about the upper end of the mandrel 48. The use of the ejector sleeve 48 permits positive displacement of the mold article 30 when the mold 10 is in the open position.

Figure 7:
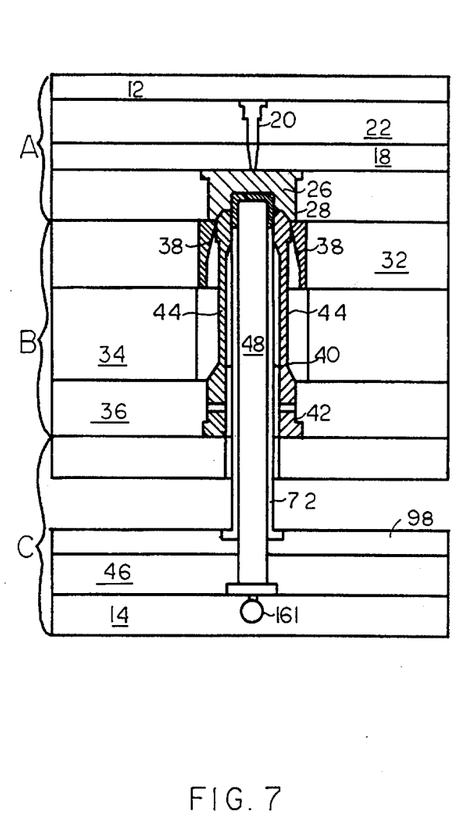
FIGS. 7–10 are schematic, illustrative sectional views of the expandable cavity element in an injection molding system with a mandrel sleeve as a positive ejection means with the system components in different positions during the operation of the molding process.
Figure 8:
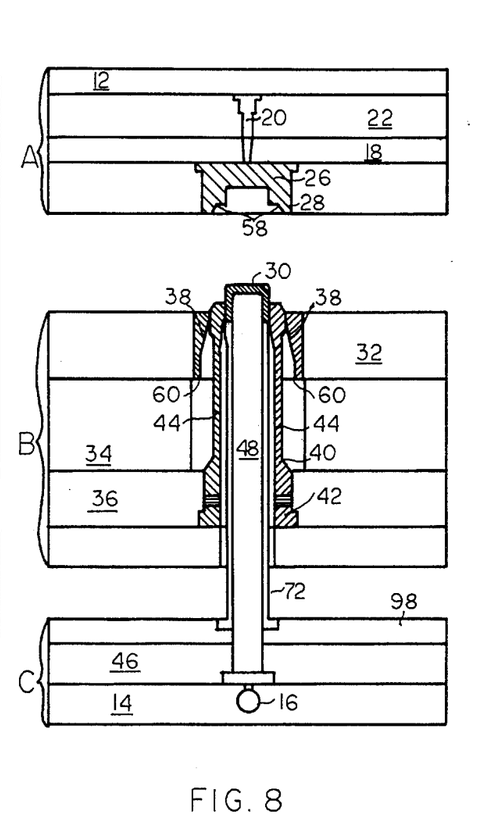
Figure 9:
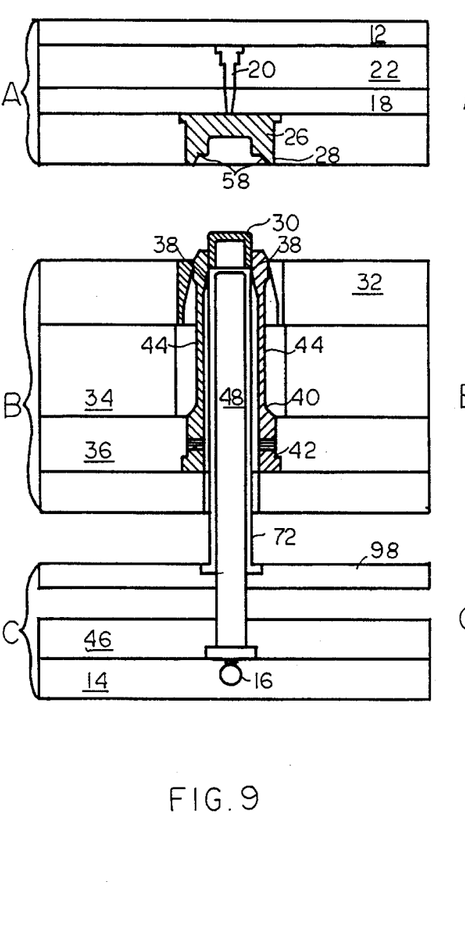

FIG. 7 illustrates the mold in the closed molding position. FIG. 8 shows the mold in an opening position after molding of the cap article 30. FIG. 9 shows the mandrel 48 in a retracted position with the one upper end of the mandrel moved downwardly, e.g. unscrewed or slid out of the mold cavity. (The mandrel movement need not occur where a collapsible core is used as the mandrel). The ejector sleeve 72 in mold plate 98 is retained in position.

Figure 10:
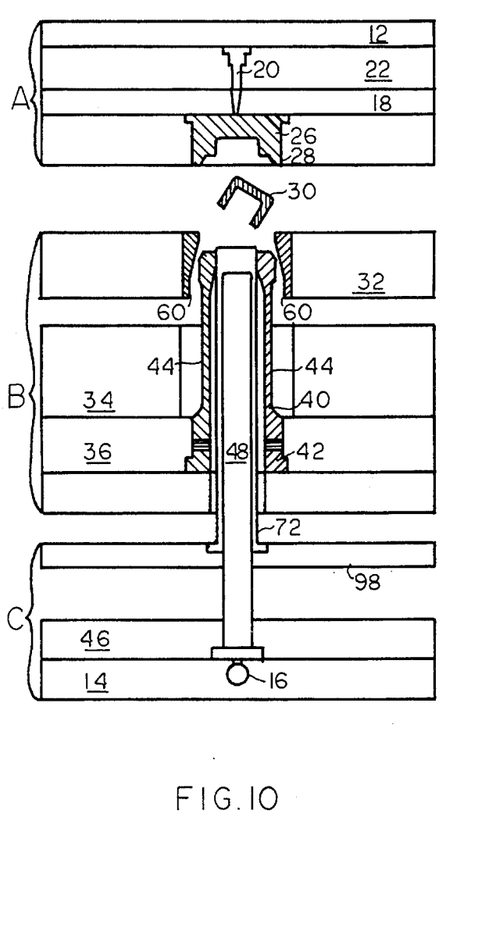

FIG. 10 shows the upward movement of the mold plate 98 with the ejector sleeve 72, so that the upper end of the ejector sleeve strikes the lower surface of the molded article 30 and positively ejects the article from the mold. The plate 98 and ejector sleeve 72 are then retracted and the mandrel returned to the position in FIG. 7 to repeat the molding operation.

Figure 11:
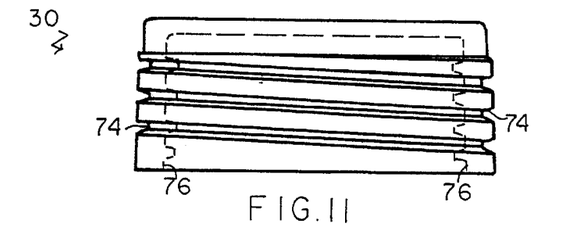
FIG. 11 is a side plan view of a tamper-evident cap produced by the injection molding system.
Figure 12:
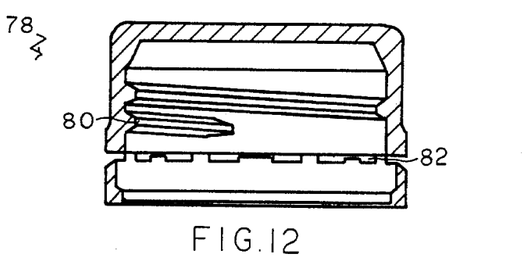
FIG. 12 is a sectional view of another molded closure product of the system.
Figure 13:
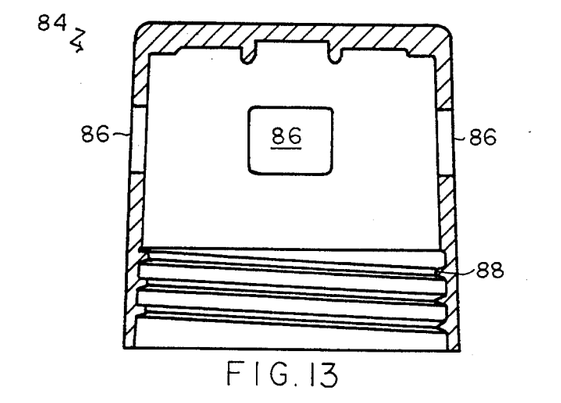
FIG. 13 is a sectional view of another molded closure product of the system.
Figure 14:
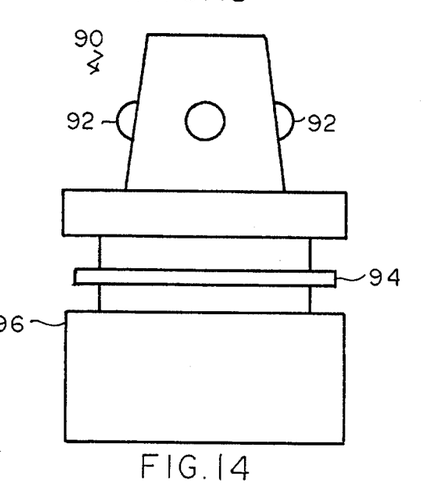
FIG. 14 is a side plan view of a molded hose connection product of the system.

FIG. 11 is an illustrated embodiment of the closure cap 30 molded by the injection molding system of the invention in which the cap 30 comprises external threads 74 formed by the internal surface recesses of the surface 64 of the expandable cavity tool 40 and internal projection threads 76 formed by the one end of the mandrel 48. FIG. 12 is illustrative of a similar or another type of cap 78 containing internal threads 80 and a plurality of windows 82 formed between the lower section of the enclosure cap 78. FIG. 13 is illustrative of a closure cap 84 with one or more peripheral windows 86 and internal threads 88 as a tamper-evident closure cap. FIG. 14 is directed to another illustration of a possible molded part produced by the injection molding system of the invention which includes, for example, a hose clamp 90 having external projections 92, an external ridge 94 and a base 96.

Figure 15:
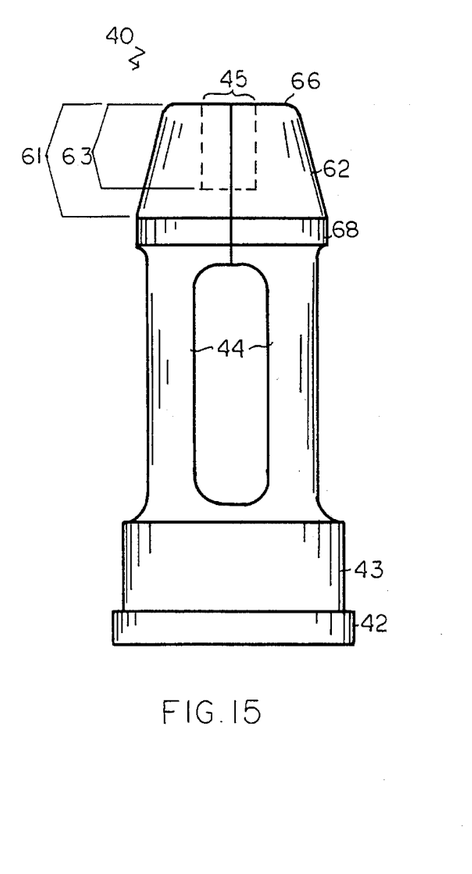
FIG. 15 shows a side elevational view of the expandable cavity element of FIGS. 1 and 2 of the invention with the molding and tapered length ratio indicated in dotted lines.

FIG. 15 is a side elevational view of the expandable cavity core element 40 in a closed molding position and having a lower base 42 surrounded by cylindrical ridge base 43 having a plurality of arms 44 leading to a generally cylindrical outer band portion 68 and the tapered surface end 62 forming a plurality of arcuate pieces 66, which form a generally cylindrical opening 45. The drawing shows the specific molding length 63 in dotted lines in reference to the outside tapered length 61 of the expandable cavity element 40. This ratio is necessary for the proper molding function of the cavity element.

Figure 16:
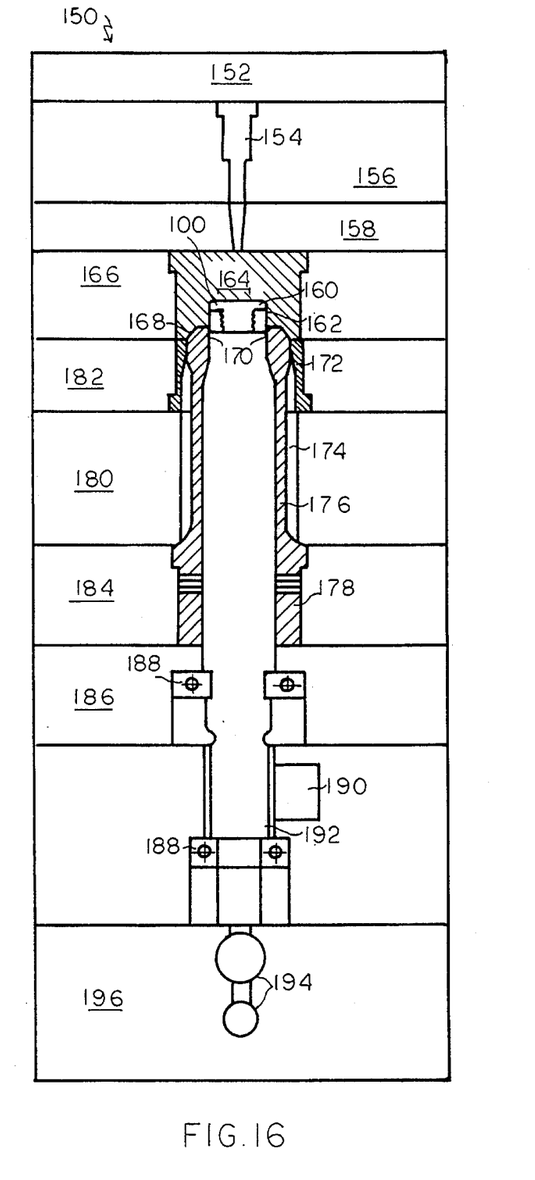
FIG. 16 shows a side sectional view of the invention of FIG. 15 within an injection molding system.

FIG. 16 is a side sectional view of the expandable cavity tool element of the invention employed in an injection molding system and method 150, wherein FIG. 16 is a composite mold composed of parts A, B and C in a molding position and including a backup plate top 152 and backup plate bottom 196 with water cooling holes 194. A spruce part plate 158 is provided, which defines a plastic material injection molding port 154 within an injection part plate 156. The mold 150 includes a striker cavity plate 166 with a striker cavity insert 164 to define a striker cavity 160. The injection molding system provides for a solid plastic article 100 illustrated and in the particular injection molding system and method described having a solid top portion 104 and a solid body portion 102 extending therefrom.

The mold includes an expansion limiter plate 182 and a support plate 180 in a cavity mounting plate 184 with a cylindrical retaining ejector sleeve 172 having an inwardly tapered internal surface at its upper end about the expandable cavity element or tool 176, in the base 178 and the arms 174 providing for an unscrewing support plate 186.

In operation, the mold 150 shows the mold components A, B and C in an injection molding position, with plastic material injected through the port 154 into the mold cavity to form the solid article 100, and with the core element in the closed molding position under tension due to the forcing together of the arms 174 by the surface 168 against the surface 169. The inside of the cavity element 170, in the closed molding position, forms the extended body portion 102 of the solid article 100.

Figure 17A:
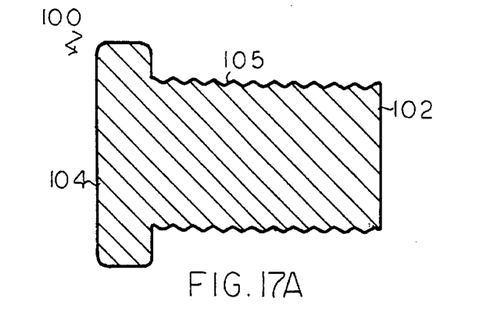
FIG. 17A and B show the solid molded article of FIG. 16, with FIG. 17A being a side sectional view and FIG. 17B being a bottom plan view.
Figure 17B:
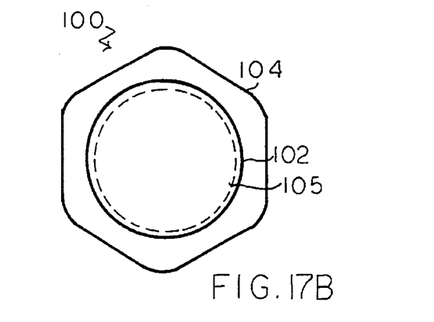

FIGS. 17A and B show the solid molded article produced by the method of FIG. 16, with the solid article 100 having a molded, polygonal top portion 104 and an extended body portion 102. FIG. 17A shows a side sectional view of the solid article 100, and FIG. 17B shows a plan view from the bottom of the solid article 100. While this solid article 100 is shown with the body portion having ridges 105, it should be noted that the extended body portion 102 may be solid as well.

Figure 18A:
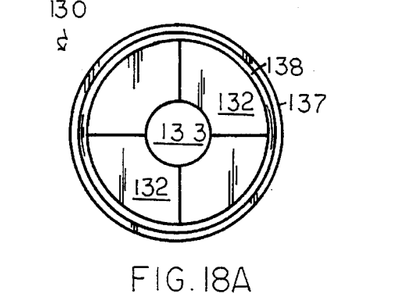
FIG. 18A and B show another embodiment of the expandable cavity element of the invention with a negative taper, FIG. 18A being a top plan view and FIG. 18B being a side elevational view.
Figure 18B:
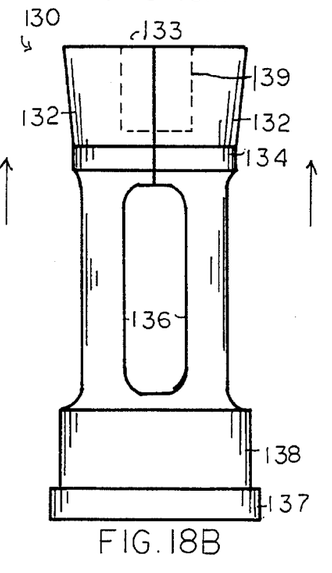

FIG. 18A and B show another embodiment of the expandable cavity element 130 with lower base 137 and a cylindrical ridge base 138 having a plurality of arms 136 extending therefrom. The arms lead to a generally cylindrical outer band portion 134 having a plurality of negatively tapered arcuate pieces 132 extending therefrom. Arrows indicate the direction the striker cavity plate and insert would come from, directly opposite from the cavity element of FIG. 1. The arcuate pieces 132 would then be forced together into a molding position, creating opening 133 at the top portion. The molding length 139 is shown in broken lines, the molding length being lesser than the tapered length.

Figure 19A:
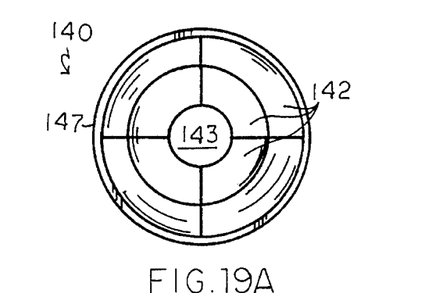
FIG. 19A and B show another embodiment of the expandable cavity element of the invention with a double tapered exterior surface, with FIG. 19A being a top plan view and FIG. 19B being a side elevational view.
Figure 19B:
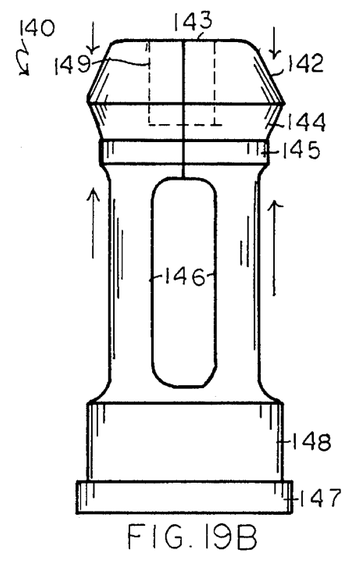

FIG. 19A and B show a further embodiment of the expandable cavity element of the invention 140, with a lower base 147 and a cylindrical ridge base 148 having a plurality of arms 146 extending therefrom. The arms lead to a generally cylindrical band portion 145 having an outwardly extending smooth surface extending therefrom, with a combined negative taper 144 and positive taper 142. This double taper configuration allows for greater expansion when it is desired to mold larger articles, with the ability to close the arms partially as a safety measure. This type of expandable cavity may be employed in molding long plastic articles.

Figure 20:
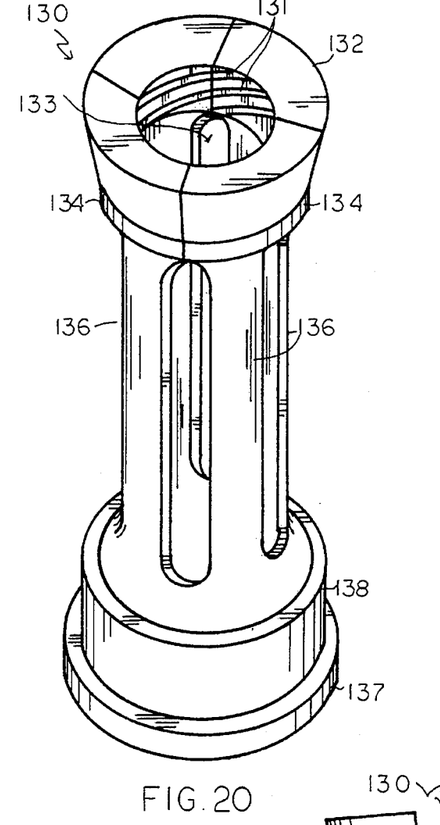
FIGS. 20–22 show additional views of the expandable cavity element of FIGS. 18A and B with FIG. 20 being a perspective view from above of the element of FIG. 18A and B in a closed molding position, FIG. 21 being a perspective view from above of the element of FIGS. 18A and B in an open, non-molding position, and FIG. 22 being a side elevational view of the element of FIG. 18A and B in an open, non-molding position.
Figure 21:
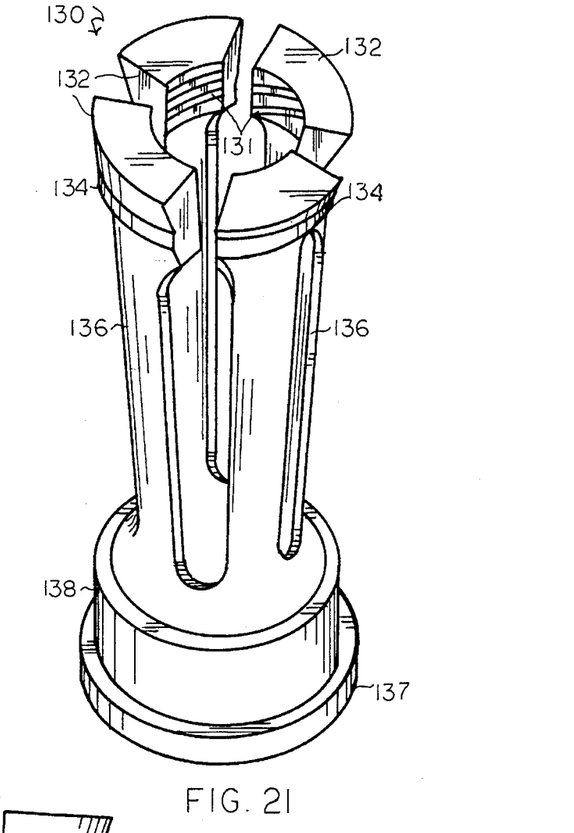
Figure 22:
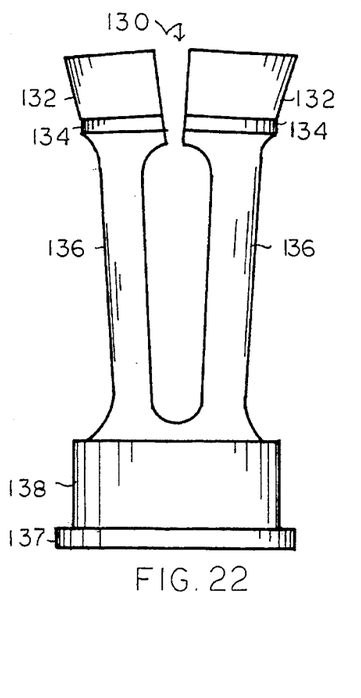

FIGS. 20–22 show further views of the cavity core element of FIGS. 18A and B, with FIG. 20 being a perspective view from above fo the element in a closed molding position showing opening 133 created by the closing of the arms 136 and the negative tapered surface 132. The molding projections 131 can be seen in both FIGS. 20 and 21. FIG. 21 shows the element of FIGS. 18A and B in an open, non-molding position with the arms 136 in a relaxed position and the tapered surfaces 132 in a side-arm non-contacting position. FIG. 22 shows a side elevational view of the element of FIGS. 18A and B with the arms 136 in an open, relapsed, non-molding position.

A wide variety of cast or molded parts may be produced by the system and method employing the expandable cavity element of the invention, wherein said parts form external projections or recesses, and optionally with both external and internal projections and recesses as illustrated. The negative or combination tapered exterior surfaces further allow for a wide variety of molded articles of different sizes and lengths as desired.

What is claimed is:

1. An expandable cavity core element adapted for use in a molding system for injection molding of a plastic molded article to be molded in a mold cavity, said article having an external surface with openings or projections thereon, which core element comprises:

a) an expandable cavity core element, having a longitudinal axis and integrally formed of a spring steel metal and having a base with an opening therethrough, and a plurality of generally vertically biased arms having a first end and a second end, the second end extending from the base, the arms at said first end adapted to extend into the mold cavity and having an extended tapered exterior surface and having an interior surface to form said projections or openings on the exterior surface of said article to be molded, the arms of the expandable cavity element adapted to move at the first end between an open, extended, biased position with the ends of the arms in an open, non-molding position, and a closed, side-arm-contacting, force-retained molding position;

b) the core element having a band section with a generally cylindrical exterior surface and having an exterior tapered surface with a tapered surface length, the tapered surface continually extending generally from the band section to the first end and defining a tapered surface length;

c) the core element defining a molding cavity at the first end when the core element is in a molding position, the cavity having an interior surface and defining a longitudinal molding length; and d) wherein the tapered surface length of the core element is equal to or greater than the molding length.

2. The core element of claim 1 wherein the exterior tapered surface extends generally outwardly from the longitudinal axis from the band section to the first end.

3. The core element of claim 2 wherein the exterior tapered surface has an outwardly extended angle of from about 3 to 35 degrees.

4. The core element of claim 1 wherein the exterior tapered surface comprises a first, outwardly exterior tapered surface having a first and second end, first end extending from the band portion to the second end and a second, inwardly exterior tapered surface having a second longitudinal length and extending from the second end of the first tapered surface to the first end of the core element.

5. The core element of claim 4 wherein the inwardly exterior tapered surface has an inwardly extended angle from the longitudinal axis of about 10 to 35 degrees.

6. The core element of claim 4 wherein the outwardly exterior tapered surface has an outwardly extended angle from the longitudinal axis of about 10 to 35 degrees.

7. The core element of claim 4 wherein the second longitudinal length is greater than the first longitudinal length.

8. The core element of claim 1 wherein the base comprises a cylindrical base and wherein the arms are extended generally uniformly from the base and range in number from about four to twelve arms.

9. The core element of claim 1 wherein said interior surface of the expandable core element comprises threaded recesses to form outward projections on said molded article.

10. The core element of claim 1 wherein the core element includes a plurality of longitudinal, generally uniformly spaced, generally oval elongated open spaces between the arms between the base and the band section.

11. The core element of claim 1 wherein the band section comprises a cylindrical band section having a smooth exterior cylindrical surface generally parallel to said longitudinal axis.

12. The core element of claim 1 wherein the tapered surface length ranges from about 1.0 to 1.2 of the molding length.

13. An expandable cavity core element adapted for use in a molding system for injection molding of a plastic molded article to be molded in a mold cavity and having an external surface with openings or projections thereon, which core element comprises:

a) an expandable cavity core element, having a longitudinal axis, integrally formed of a spring steel metal and having a base with an opening therethrough and a plurality of generally uniformly, spaced apart, vertically extending biased arms having a first end and a second end, the second end extending from the base and extending about the opening, the arms at said first end adapted to extend into the mold cavity and having an interior surface to form the projections or openings on the exterior surface of said article to be molded, the arms of the expandable cavity element adapted to move at the first end between an open, extended, biased position with the ends of the arms in an open, side-arm non-contacting, non-molding position, and a closed end, side-arm contacting, mechanically force-retained molding position;

b) the core element having a short, band section having a generally cylindrical exterior surface generally parallel to the longitudinal axis and toward the first end and having a continuous double first and second tapered exterior surface having a tapered surface length, the first tapered surface extending generally longitudinally outward from the band section and toward the first end and the second tapered surface extending longitudinally inward to the first end; and c) the core element defining a molding cavity at the first end when the core element is in a molding position, the cavity having an interior surface and defining a longitudinal molding length; and d) wherein the tapered surface length of the core element is equal to or greater than the molding length.

14. An expandable cavity core element adapted for use in a molding system for injection molding of a plastic molded article to be molded in a mold cavity and having an external surface with openings or projections thereon, which core element comprises:

a) an expandable cavity core element, having a longitudinal axis, integrally formed of a spring steel metal and having a base with an opening therethrough and a plurality of generally uniformly, spaced apart, vertically extending biased arms having a first end and a second end, the second end extending from the base and extending about the opening, the arms at said first end adapted to extend into the mold cavity and having an interior surface to form the projections or openings on the exterior surface of said article to be molded, the arms of the expandable cavity element adapted to move at the first end between an open, extended, biased position with the ends of the arms in an open, side-arm non-contacting, non-molding position, and a closed end, side-arm contacting, mechanically force-retained molding position; and b) the core element having a short band section toward the first end and having a tapered exterior surface extending generally longitudinally outward at an angle of about 10 to 35 degrees from the longitudinal axis from the band section to the first end.

15. An injection molding system to provide an injection molded plastic article having external surface projections or openings, which injection molding system comprises:

a) an injection mold having a molding cavity;

b) means to inject a plastic into the molding cavity;

c) means to move the injection mold between an open position to recover an injection molded plastic article, and a closed molding position; and d) an expandable cavity core element, having a longitudinal axis and integrally formed of a spring steel metal and having a base with an opening therethrough, and a plurality of generally vertically biased arms having a first end and a second end, the second end extending from the base, the arms at said first end adapted to extend into the mold cavity and having an extended tapered exterior surface and having an interior surface to form said projections or openings on the exterior surface of said article to be molded, the arms of the expandable cavity element adapted to move at the first end between an open, extended, biased position with the end of the arms in an open, non-molding position, and a closed, side-arm-contacting force-retained molding position;

e) the core element having a band section with a generally cylindrical exterior surface and having an exterior tapered surface with a tapered surface length, the tapered surface continually extending generally from the band section to the first end and defining a tapered surface length;

f) the core element defining a molding cavity at the first end when the core element is in a molding position, the cavity having an interior surface and defining a longitudinal molding length; and g) wherein the tapered surface length of the core element is equal to or greater than the molding length.

16. The system of claim 15 which includes an internal threadable mandrel means having an one and other end, one end and adapted to be threadably inserted into the molding cavity in the molding position of the mold to form with the interior surface of said core element a molding cavity for the formation of a plastic molded article with external projections or openings, and a threaded interior surface, and to be threadably removed from the mold cavity after molding of the molded article.

17. The system of claim 16 which includes an expansion limiter sleeve means positioned about the first end of said core element in the molding position to contact the exterior surface of the band section and to restrict the full outer biased movement of the arms of said core element after molding the article and to hold the molded article in the mold cavity with sufficient force to permit the removal of the internal mandrel from within the molded article in the molding cavity.

18. The system of claim 15 wherein the means to move includes means to force mechanically said first end of the biased arm of the core element into a closed, side-arm contacting, molding position within the molding cavity of the mold, by a striker plate against the tapered surface of said core element.

19. The system of claim 15 wherein said core element has an outwardly continuous smooth, extended tapered surface from the band section to the first end with an outward angle of about 10 to 35 degrees and with the tapered surface length to the molding length ranging from about 1.0 to 1.2.

* * * * *